UNITED STATES PATENT OFFICE.

ROSS W. BLACK, OF PITTSBURG, PENNSYLVANIA.

STYPTIC REMEDY.

SPECIFICATION forming part of Letters Patent No. 459,738, dated September 22, 1891.

Application filed September 17, 1890. Serial No. 365,297. (Specimens.)

*To all whom it may concern:*

Be it known that I, ROSS W. BLACK, a citizen of the United States, residing at Pittsburg, county of Allegheny, and State of Pennsylvania, have invented a certain new and useful Composition of Matter or Styptic to be Used for Preventing or Stopping Bleeding in Cuts, of which the following is a specification.

My composition consists of the following ingredients combined in the proportions stated, viz: subsulphate of iron, eight parts; pulverized alum, four parts; gum-arabic, one-half part; water, five-twelfths part.

In forming my composition of which I form a styptic pencil or stick I take eight pounds of subsulphate of iron and four pounds of pulverized alum and place these two ingredients in an aluminum pan and bring the same to a very high temperature by placing the same over a red-hot fire, and thereby calcining both the articles. After this the ingredients are removed from the pan and pulverized by means of a suitable apparatus, sometimes using the ordinary druggist's mortar for this purpose. This pulverizing material is now mingled with one ounce gum-arabic and five ounces of water, which converts the ingredients into a soft mass or plastic substance. A small portion of this substance is taken and rolled into a cylindrical body or stick, which puts the same into marketable shape. It soon becomes hardened and will retain its original form.

The directions for using this styptic stick are: Moisten the cut with a wet sponge and hold the composition to it for a short time, until the blood ceases to flow.

What I claim, and desire to secure by Letters Patent, is—

The herein-described composition of matter to be used for checking the bleeding of cuts or wounds, consisting of subsulphate of iron, pulverized alum, gum-arabic, and water, in or about the proportions stated.

In testimony that I claim the foregoing I hereunto affix my signature this 3d day of September, A. D. 1890.

ROSS W. BLACK. [L. S.]

In presence of—
C. C. LEE,
M. E. HARRISON.